US009521377B2

(12) United States Patent
Hu

(10) Patent No.: US 9,521,377 B2
(45) Date of Patent: *Dec. 13, 2016

(54) MOTION DETECTION METHOD AND DEVICE USING THE SAME

(71) Applicant: Sercomm Corporation, Taipei (TW)

(72) Inventor: Shiou-Hua Hu, Irvine, CA (US)

(73) Assignee: SERCOMM CORPORATION, Taipei (TW)

( * ) Notice: Subject to any disclaimer, the term of this patent is extended or adjusted under 35 U.S.C. 154(b) by 277 days.

This patent is subject to a terminal disclaimer.

(21) Appl. No.: 14/195,911

(22) Filed: Mar. 4, 2014

(65) Prior Publication Data

US 2015/0098685 A1  Apr. 9, 2015

Related U.S. Application Data

(60) Provisional application No. 61/888,039, filed on Oct. 8, 2013.

(51) Int. Cl.
| | |
|---|---|
| H04N 7/18 | (2006.01) |
| G06T 7/20 | (2006.01) |
| H04N 5/91 | (2006.01) |
| H04N 9/79 | (2006.01) |
| H04N 5/14 | (2006.01) |
| H04N 5/76 | (2006.01) |
| G08B 13/196 | (2006.01) |

(52) U.S. Cl.
CPC ............ *H04N 7/183* (2013.01); *G06T 7/2053* (2013.01); *G08B 13/19606* (2013.01); *H04N 5/144* (2013.01); *H04N 5/76* (2013.01); *H04N 5/91* (2013.01); *H04N 9/79* (2013.01); *G06T 2207/10016* (2013.01); *G06T 2207/30232* (2013.01)

(58) Field of Classification Search
CPC ................. G06K 9/00711; G06T 2207/10016; G06T 7/20; G06T 7/2053; G08B 13/19604; H04N 5/91; H04N 5/144
USPC ....................................... 348/155, 152, 154
See application file for complete search history.

(56) References Cited

U.S. PATENT DOCUMENTS

| | | | | |
|---|---|---|---|---|
| 7,124,427 B1 * | 10/2006 | Esbensen | ......... | G08B 13/19656 340/541 |
| 9,036,943 B1 * | 5/2015 | Baldwin | ............ | G06K 9/00664 382/103 |
| 2004/0086152 A1 * | 5/2004 | Kakarala | ............... | G06T 7/2053 382/103 |
| 2004/0212678 A1 * | 10/2004 | Cooper | ............ | G08B 13/19602 348/155 |
| 2005/0111696 A1 * | 5/2005 | Baer | ..................... | H04N 7/188 382/103 |

(Continued)

*Primary Examiner* — Nathnael Aynalem
(74) *Attorney, Agent, or Firm* — McClure, Qualey & Rodack, LLP

(57) ABSTRACT

A motion detection method is provided. The method includes steps of: recording an input video having a plurality of windows of interest (WOIs), extracting a reference frame from the input video in every reference updating cycle, extracting a target frame from the input video and determining whether an event occurs in each of the WOIs by comparing the target frame with the reference frame in every checking cycle, and comparing the number of WOIs in which the event occurs in every observation cycle with a threshold to determine whether the input video contains a motion during the observation cycle.

20 Claims, 3 Drawing Sheets

(56) References Cited

U.S. PATENT DOCUMENTS

| | | | |
|---|---|---|---|
| 2009/0231453 A1* | 9/2009 | Huang | H04N 5/144 |
| | | | 348/220.1 |
| 2010/0188505 A1* | 7/2010 | Iwanaga | G06K 9/00771 |
| | | | 348/143 |
| 2011/0229030 A1* | 9/2011 | Ogura | G06T 7/001 |
| | | | 382/170 |
| 2012/0116548 A1* | 5/2012 | Goree | A61B 5/1118 |
| | | | 700/90 |
| 2012/0120237 A1* | 5/2012 | Trepess | G06T 7/2053 |
| | | | 348/143 |

* cited by examiner

MOTION DETECTION METHOD AND DEVICE USING THE SAME

This application claims the benefit of a provisional application Ser. No. 61/888,039, filed Oct. 8, 2013, the subject matter of which is incorporated herein by reference.

BACKGROUND

Field of the Invention

The disclosure relates in general to a motion detection method and device using the same, and more particularly to a motion detection method and device capable of reducing false positive errors.

Related Art

Recently, Internet Protocol (IP) cameras have been widely used. IP cameras are digital video cameras that may be used for security and can send and receive information via a network. Motion detection can help an IP camera to extract useful video frames containing motions. Thus there is a need for an accurate motion detection method.

SUMMARY

The disclosure is directed to a motion detection method and device using the same. One of the advantages of the method is to reduce the possibility of false positive errors.

According to one embodiment, a motion detection method is provided. The motion detection method includes steps of: recording an input video having a plurality of windows of interest (WOIs), extracting a reference frame from the input video in every reference updating cycle, extracting a target frame from the input video and determining whether an event occurs in each of the WOIs by comparing the target frame with the reference frame in every checking cycle, and comparing the number of WOIs in which the event occurs in every observation cycle with a threshold to determine whether the input video contains a motion during the observation cycle.

According to another embodiment, a motion detection device is provided. The motion detection device includes a video recording unit for recording an input video having a plurality of WOIs, a storage unit for storing the recorded input video, and a processing unit for extracting a reference frame from the input video in every reference updating cycle, extracting a target frame from the input video and determining whether an event occurs in each of the WOIs by comparing the target frame with the reference frame in every checking cycle, and comparing the number of WOIs in which the event occurs in every observation cycle with a threshold to determine whether the input video contains a motion during the observation cycle.

Figure 1:
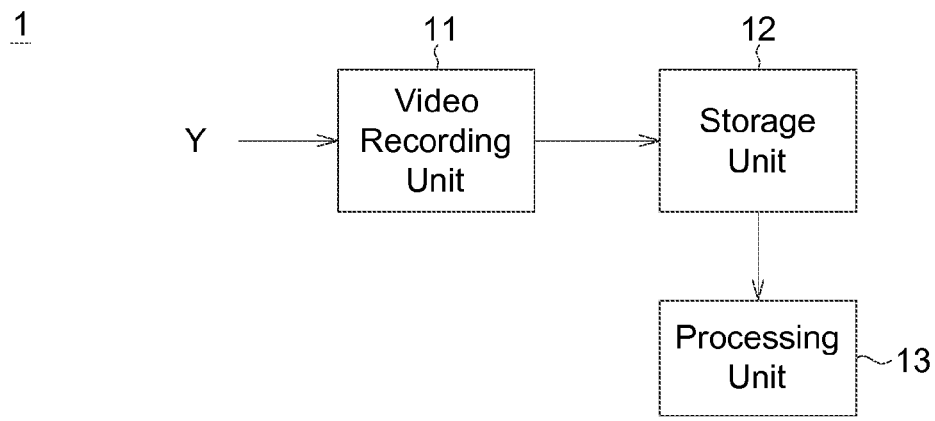
FIG. 1 shows a block diagram of a motion detection device according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

IP camera is well-known for the use in home security. The IP camera may detect motions in the video in order to extract useful information from the video. For example, the motion may be an unexpected person walking in front of the entrance. Conventional IP cameras may extract some video frames that in fact do not contain motions. For example, a background object having little movement (such as tree leaves) may be falsely regarded as a motion. Such situation is actually not a "real motion" that is of interest to the user. These results are so-called "false positive errors" or "false alarms" since the video is determined to contain a motion while in fact no real motion of interest exists. It is therefore provided a motion detection method that can greatly reduce the false positive errors for better motion detection accuracy.

FIG. 1 shows a block diagram of a motion detection device according to one embodiment of the present invention. Referring to FIG. 1, the motion detection device 1 includes a video recording unit 11, a storage unit 12, and a processing unit 13. For example, the video recording unit 11 may be a Charge-Coupled Device (CCD) sensor or a Complementary Metal-Oxide-Semiconductor (CMOS) sensor. The storage unit 12 may be a memory. The processing unit 13 may be a processor. As another example, the motion detection device 1 may constitute a part of an IP camera.

Figure 2:
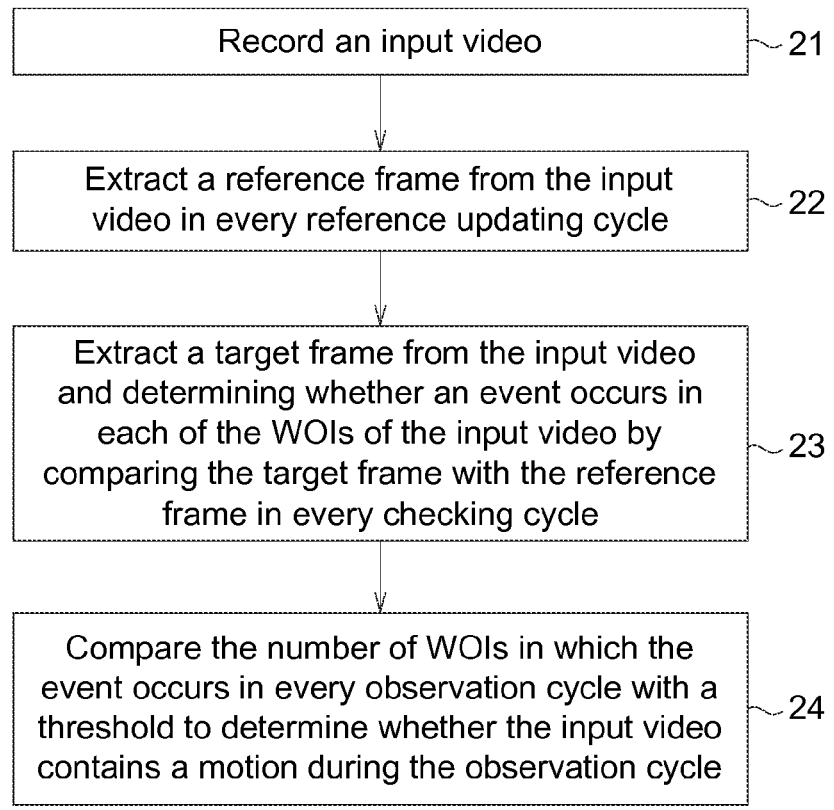
FIG. 2 shows a flow chart of a motion detection method according to one embodiment of the invention.

FIG. 2 shows a flow chart of a motion detection method according to one embodiment of the invention. Referring to FIG. 2, the motion detection method includes the following steps. In step 21, an input video Y having a plurality of windows of interest (WOIs) is recorded. In step 22, a reference frame Fr is extracted from the input video Y in every reference updating cycle Tr. In step 23, a target frame Ft is extracted from the input video Y and compared with the reference frame Fr in every checking cycle Tc to determine whether an event occurs in each of the WOIs. In step 24, the number of WOIs in which the event occurs in every observation cycle To is compared with a threshold N to determine whether the input video Y contains a motion during the observation cycle To. The detailed description of each step is as follows.

In step 21, the video recording unit 11 records an input video Y. The storage unit 12 stores the recorded input video Y. The processing unit 13 further processes the image data stored in the storage unit 12 to detect motion in the input video Y.

Figure 3:
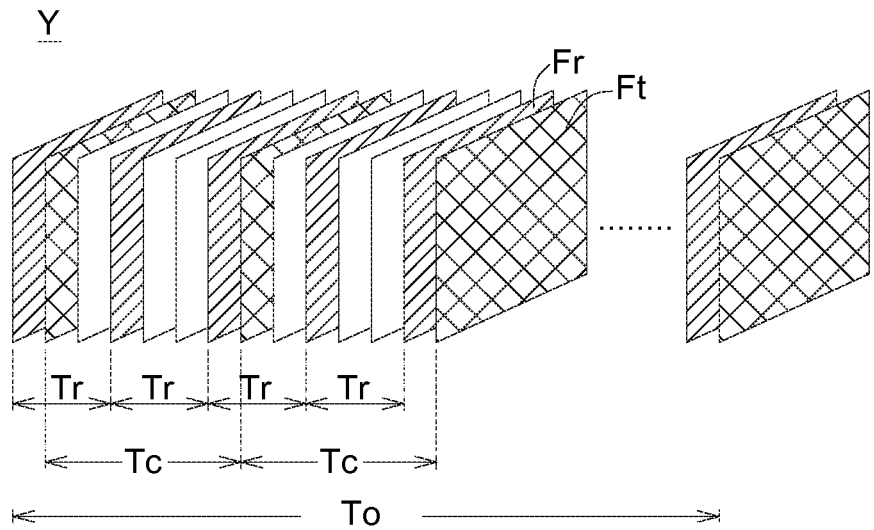
FIG. 3 shows an example of a detailed diagram of video frames in the input video.

In step 22, the processing unit 13 extracts a reference frame Fr from the input video Y in every reference updating cycle Tr. FIG. 3 shows an example of a detailed diagram of video frames in the input video Y. Referring to FIG. 3, the input video Y includes a number of frames. A reference frame Fr is extracted in every reference updating cycle Tr. For the example illustrated in FIG. 3, the input video Y is a video with frame rate 30 frames per second. The reference updating cycle Tr is equal to 0.1 second. That is, the reference frame Fr is updated every 3 video frames.

In step 23, the processing unit 13 extracts a target frame Ft from the input video Y and determines whether an event occurs by comparing the target frame Ft with the reference frame Fr in every checking cycle Tc. In this example, the checking cycle Tc is equal to 0.2 second. That is, the target frame Ft is updated every 6 video frames. Once the target frame Ft is updated, the processing unit 13 compares the target frame Ft with the reference frame Fr to determine whether an event occurs in each of the WOIs. Please note that if a new frame is extracted as a reference frame and a target frame, it will be first extracted as a target frame and compared with a previous reference frame. After the comparison the frame will replace the previous reference frame and then be compared with other subsequent target frame(s).

Figure 4:
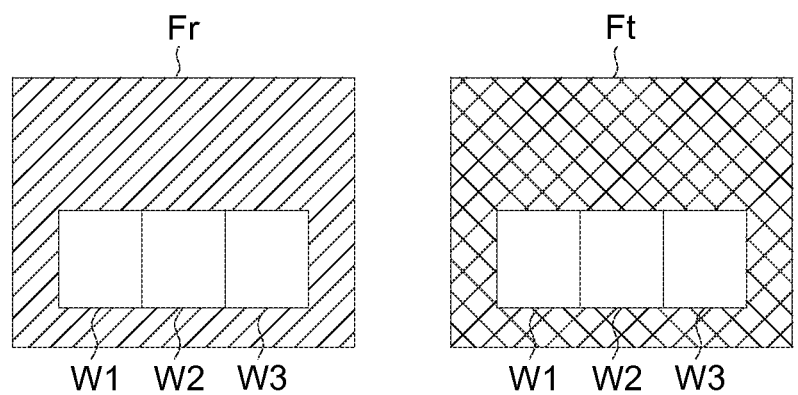
FIG. 4 shows WOIs in the reference frame and in the target frame of the input video.

FIG. 4 shows WOIs in the reference frame and in the target frame of the input video. The input video Y includes a number of WOIs in which the pixel values within the WOIs are of interest in detecting motion in the input video Y. The number of WOIs can be set by the user manually to control how large the area is of interest in detecting motion. The setup can be done by, for example, drawing a rectangle on a monitor to designate the location and the size of area of interest. Alternatively, the number of WOIs may be set by the system automatically. In the example shown in FIG. 4, the number of WOIs is set to be 3, and the locations of the WOIs, including WOI W1, W2, and W3, are set as windows near the bottom edge of the video where human and animals often appear. The total area that all the WOIs occupy is usually smaller than the image size in order to save computation cost, in terms of memory space and computation time required. However, the total area of all WOIs may also be of the same size as the entire video frame in order to take the most pixels into consideration. The processing unit 13 calculates a pixel difference value in each of the WOIs of the input video Y between the target frame Ft and the reference frame Fr.

To calculate the pixel difference value in WOI W1, the processing unit 13 compares each pixel in WOI W1 of the target frame Ft and a pixel in the corresponding location in WOI W1 of the reference frame Fr. The pixel difference value may be defined as the sum of absolute differences (SAD) between each pair of corresponding pixels in WOI W1. Alternatively, the pixel difference value may be defined as the percentage of pixels having different pixel value between pixels in WOI W1 of the target frame Ft and pixels in WOI W1 of the reference frame Fr. If the pixel difference value exceeds an event threshold value B, the processing unit 13 determines that an event has occurred in WOI W1. The processing unit 13 also calculates the pixel difference value in WOI W2 and WOI W3 to determine if an event occurs in those WOIs.

In step 24, the processing unit 13 compares the number of WOIs in which the event occurs in every observation cycle To with a threshold N to determine whether the input video Y contains a motion during the observation cycle To. Referring to FIG. 3, in this example, the observation cycle To is equal to 1 second. One observation cycle includes 5 checking cycles. The processing unit 13 determines whether the input video Y contains a motion depending on how many WOIs have been triggered by an event during the observation cycle To.

In addition to counting the number of WOIs that have been triggered by an event, the processing unit 13 may also record a triggered pattern Wi representing a sequence of the WOIs in which the event occurs in the observation cycle To. A WOI is defined as being "triggered" when an event is detected in that WOI. The triggered pattern Wi may be, for example, {W1→W2→W3} representing the WOIs are triggered from left to right, indicating that an object is probably moving from left to right in the input video Y. For a more advanced and detailed motion detection requirement, the recorded triggered pattern Wi may be used for determining movement characteristics of an object in the input video Y, such as movement direction and movement speed.

The observation cycle To may be greater than the checking cycle Tc such that multiple events can be detected in one observation cycle To. In addition, the checking cycle Tc is preferably greater than or equal to the reference updating cycle Tr such that every target frame Ft is compared with a reference frame Fr that is very close to it and hence a precise motion detection can be achieved.

It should be noted that the order of each step in FIG. 2 is just exemplary, rather than fixed. Depending on the choice of the parameters, including observation cycle To, checking cycle Tc, and reference updating cycle Tr, each individual step may overlap with the others or be performed several times before entering the next step. For example, step 22 and step 23 may be performed several times before entering step 24.

If the number of WOIs in which the event occurs in the observation cycle To is greater than the threshold N, the input video Y is determined to contain a motion during the observation cycle To. For example, the threshold N may be set as an integer greater than 1, such that multiple WOIs must be triggered during one observation cycle To for the input video Y to be determined as containing a motion.

If the input video Y is determined to contain the motion during the observation cycle To, the processing unit 13 may upload at least one frame of the input video Y in the observation cycle To to a cloud server. The motion information is thus stored and the user can examine the video frame containing a motion stored in the cloud server later on. The processing unit 13 may also send a notification (e.g. an E-mail or a message) to inform the user a motion is detected.

The motion detection device 1 may be, for example, an IP camera that is used for home security. The motion detection device 1 may record the image near the home entrance continuously twenty-four hours a day or after the security system has been armed. Because it is not practical to have the user watch the recorded video every second, the motion detection device 1 alerts the user only when a motion is detected in the input video. As described above, the motion detection device 1 uploads the video frames containing motions to a cloud server such that the user can watch the video frames of interest. And since the video frames containing motion are stored, the video frames can be examined repeatedly and thoroughly afterwards. Alternatively, the motion detection device 1 may send a notification to the user's mobile equipment, such as a mobile phone, such that the user can monitor the home security remotely even without being at home. The user may even examine the video recorded via the mobile phone directly. Real-time remote security monitoring can hence be achieved.

The motion detection method disclosed herein does not require complicated computation steps. The process involved includes pixel difference calculation and counting the number of WOIs in which the event occurs. There is no need for a high-performance processor to perform complicated computation tasks. Power consumption of a processor can be saved. Moreover, the processor cost can be reduced since the motion detection method can be accomplished by a simple processing unit. Therefore the motion detection method may be implemented in an embedded system and a good motion detection capability can be achieved.

Figure 5A:
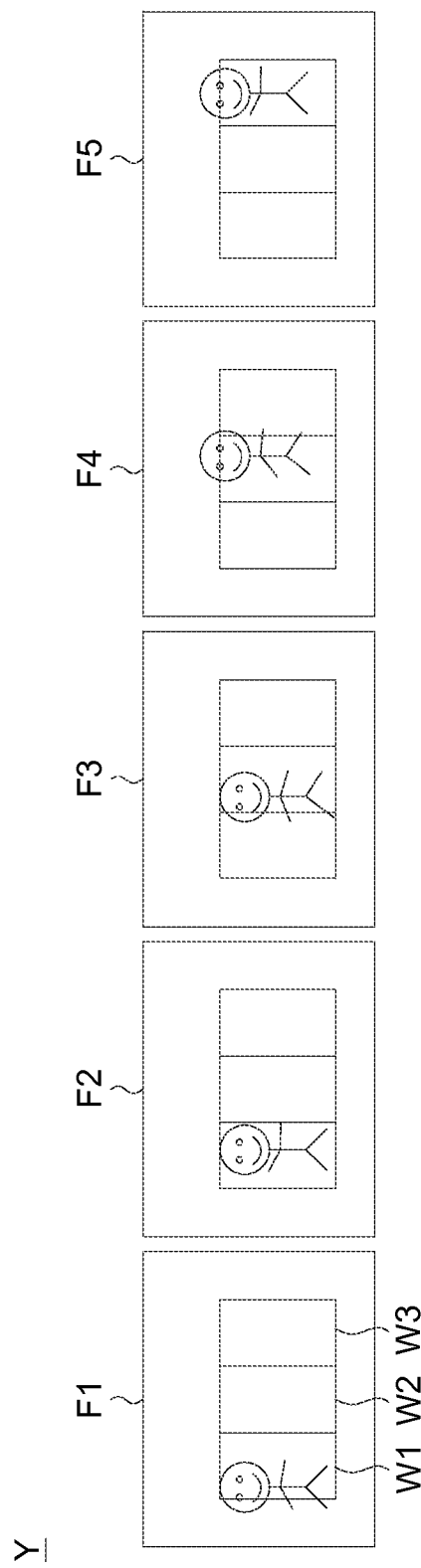
FIG. 5A and FIG. 5B illustrate examples of motion detection of an input video according to one embodiment of the invention.
Figure 5B:
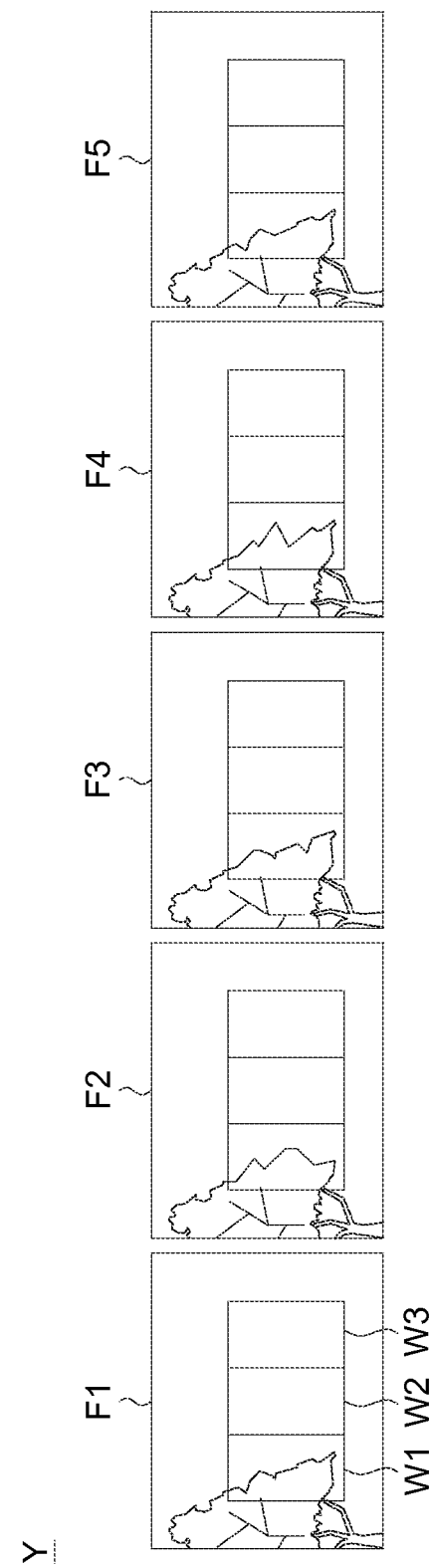

FIG. 5A and FIG. 5B illustrate examples of motion detection of an input video according to one embodiment of the invention. In this example, the location where the video being captured is near the door entrance of a building. The motion detection device 1 is located outdoors to capture the video outside the building. The number of WOIs is set to be 3 in this example. Parameters are set as follows: observation cycle To equals 1.0 sec, checking cycle Tc equals 0.2 sec, reference updating cycle Tr equals 0.1 sec, and the threshold N equals 2. Video frames F1~F5 correspond to time T=0.2 sec, 0.4 sec, 0.6 sec, 0.8 sec, and 1.0 sec, respectively.

In the example shown in FIG. 5A, a person walks past the door entrance from the left side to the right side of the video frame. At video frame F1, an event is detected only in WOI W1. The number of WOIs in which an event occurs accumulated so far is equal to 1. Later on, WOI W2 is triggered at video frame F3, and WOI W3 is triggered at video frame F4. Because all of the WOIs, including WOI W1, W2, and W3, have been triggered during the observation cycle To, the total number of WOIs in which an event has occurred is equal to 3, which is greater than the threshold N=2. Therefore the input video Y is determined to contain a motion during the observation cycle To. In addition, the triggered pattern Wi is recorded as {W1→W2→W3} in this example.

Comparing with another example shown in FIG. 5B where a background object has constant movement in a specific area, such as movement of tree leaves due to the wind. The tree leaves are moving constantly hence an event is detected at every video frame F1~F5. However, only WOI W1 is triggered during the observation cycle To. The number of WOIs in which an event occurs is equal to 1, which is smaller than the threshold N=2. Therefore such event is filtered out and the input video Y is determined to contain no motion during the observation cycle To.

As described above, the input video is determined to contain a motion only when the number of WOIs in which an event occurs during the observation cycle is greater than the threshold N. Therefore constant little movement of a background object, such as shade or leaves, is filtered out by setting an appropriate threshold N. The motion detection method disclosed herein avoids the detection of such events and hence reduces the probability of false positive errors. Traditionally such event is regarded as a motion and will be extracted by the motion detection device. Adopting the motion detection method in this disclosure, the video frames extracted are likely to contain "real" motions. Moreover, the motion detection method disclosed herein does not involve complicated computation and can be accomplished by a simple processing unit. Hardware cost is reduced while at the same time better motion detection accuracy can be achieved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A motion detection method, comprising:
   recording an input video having a plurality of image frames, with each image frame having a plurality of windows of interest (WOIs);
   extracting a reference frame from the input video in every reference updating cycle;
   extracting a target frame from the input video and determining whether an event occurs in each of the WOIs by comparing the target frame with the reference frame in every checking cycle; and
   comparing the number of WOIs in which the event occurs in every observation cycle with a threshold to determine whether the input video contains a motion during the observation cycle;
   wherein the observation cycle is greater than the checking cycle, and the checking cycle is greater than or equal to the reference updating cycle.

2. The motion detection method according to claim 1, wherein the step of extracting the target frame from the input video and determining whether the event occurs in each of the WOIs by comparing the target frame with the reference frame in every checking cycle further comprises:
   calculating a pixel differential value in each WOI between the target frame and the reference frame;
   wherein the event occurs when the pixel differential value exceeds an event threshold value, and the pixel differential value is the percentage of pixels having different pixel value between pixels in one of the WOIs of the target frame and pixels in the corresponding WOI of the reference frame.

3. The motion detection method according to claim 1, wherein the input video is determined to contain the motion during the observation cycle if the number of WOIs in which the event occurs in the observation cycle is greater than the threshold.

4. The motion detection method according to claim 1, wherein the threshold is an integer greater than 1.

5. The motion detection method according to claim 1, further comprising:
   uploading at least one frame of the input video in the observation cycle to a cloud server if the input video is determined to contain the motion during the observation cycle.

6. The motion detection method according to claim 1, further comprising:
   sending a notification to a user if the input video is determined to contain the motion during the observation cycle.

7. The motion detection method according to claim 1, further comprising:
   recording a triggered pattern representing a sequence of the WOIs in which the event occurs in the observation cycle.

8. The motion detection method according to claim 7, wherein the triggered pattern is used for determining movement characteristics of an object in the input video.

9. The motion detection method according to claim 8, wherein the movement characteristics comprise at least one of movement direction and movement speed.

10. A motion detection device, comprising:
    a video recording circuit for recording an input video having a plurality of image frames, with each image frame having a plurality of windows of interest (WOIs);
    a storage circuit for storing the recorded input video; and
    a processing circuit for extracting a reference frame from the input video in every reference updating cycle, extracting a target frame from the input video and determining whether an event occurs in each of the WOIs by comparing the target frame with the reference frame in every checking cycle, and comparing the number of WOIs in which the event occurs in every observation cycle with a threshold to determine whether the input video contains a motion during the observation cycle, wherein the observation cycle is greater than the checking cycle, and the checking cycle is greater than or equal to the reference updating cycle.

11. The motion detection device according to claim 10, wherein the processing circuit further calculates a pixel differential value in each WOI between the target frame and the reference frame to determine whether the event occurs, wherein the event occurs when the pixel differential value exceeds an event threshold value, and the pixel differential value is the percentage of pixels having different pixel value between pixels in one of the WOIs of the target frame and pixels in the corresponding WOI of the reference frame.

12. The motion detection device according to claim 10, wherein the input video is determined to contain the motion during the observation cycle if the number of WOIs in which the event occurs in the observation cycle is greater than the threshold.

13. The motion detection device according to claim 10, wherein the threshold is an integer greater than 1.

14. The motion detection device according to claim 10, wherein the processing circuit further uploads at least one frame of the input video in the observation cycle to a cloud server if the input video is determined to contain the motion during the observation cycle.

15. The motion detection device according to claim 10, wherein the processing circuit further sends a notification to a user if the input video is determined to contain the motion during the observation cycle.

16. The motion detection device according to claim 10, wherein the processing circuit further records a triggered pattern representing a sequence of the WOIs in which the event occurs in the observation cycle.

17. The motion detection device according to claim 16, wherein the triggered pattern is used for determining movement characteristics of an object in the input video.

18. The motion detection device according to claim 17, wherein the movement characteristics comprise at least one of movement direction and movement speed.

19. The motion detection method according to claim 1, wherein each of the WOIs comprises a plurality of pixels.

20. The motion detection device according to claim 10, wherein each of the WOIs comprises a plurality of pixels.

* * * * *